May 7, 1957 H. E. HOOE 2,791,275
DUPLICATING PUNCH

Filed Dec. 4, 1953 6 Sheets-Sheet 1

HUNTER E. HOOE
INVENTOR.

BY
Mellin and Hanscom
ATTORNEYS

May 7, 1957  H. E. HOOE  2,791,275
DUPLICATING PUNCH

Filed Dec. 4, 1953  6 Sheets-Sheet 2

HUNTER E. HOOE
INVENTOR.

BY
Meelin and Hanscom
ATTORNEYS

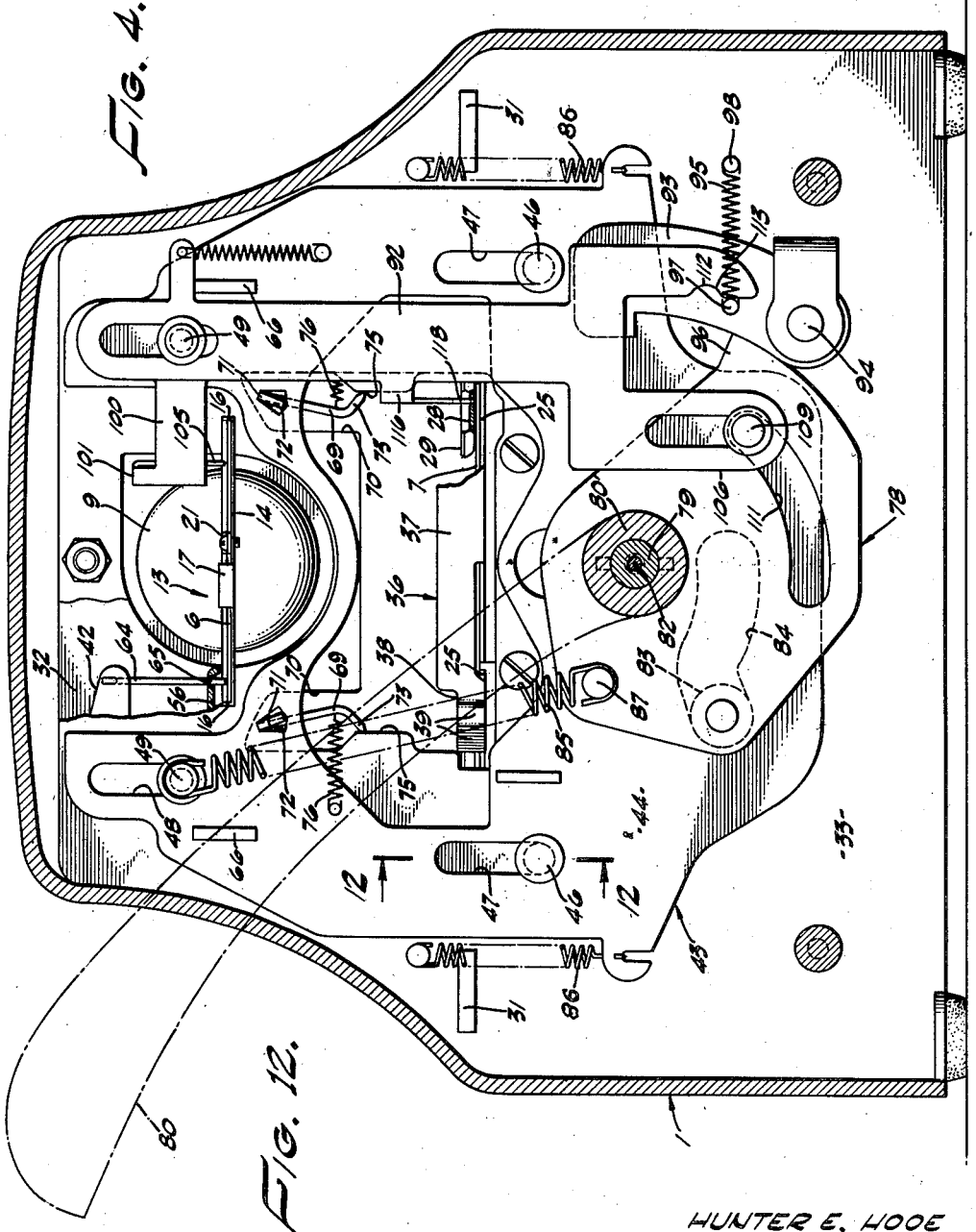

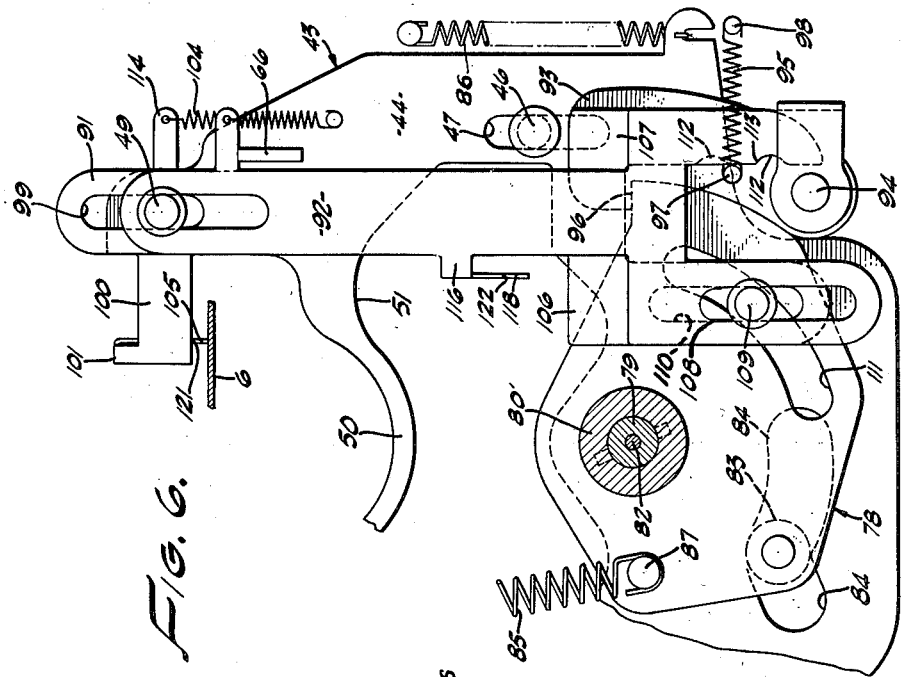
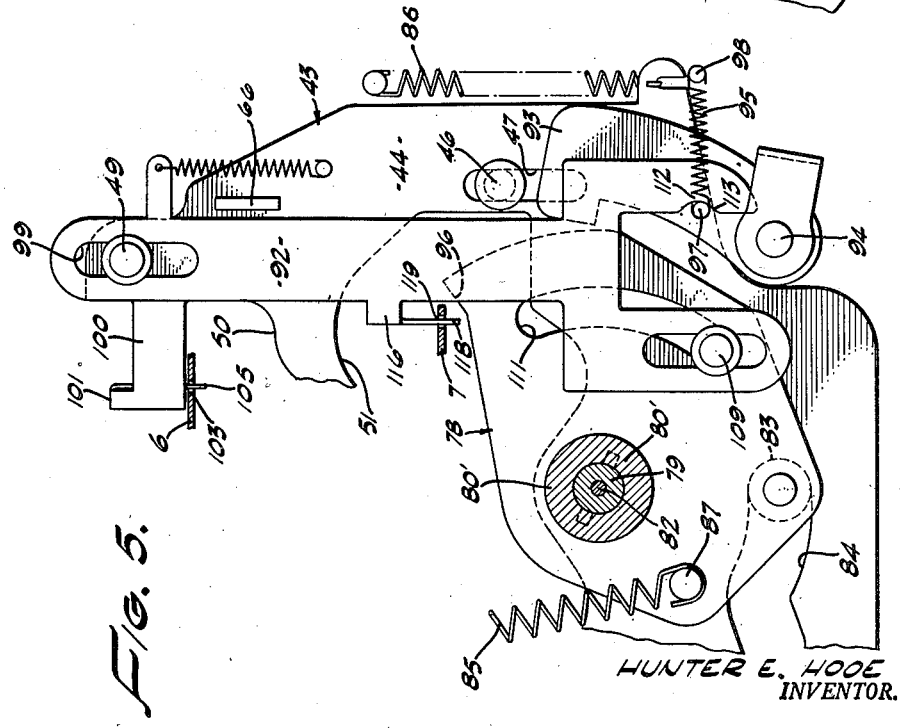
HUNTER E. HOOE
INVENTOR.
BY Mellen and Hanscom
ATTORNEYS

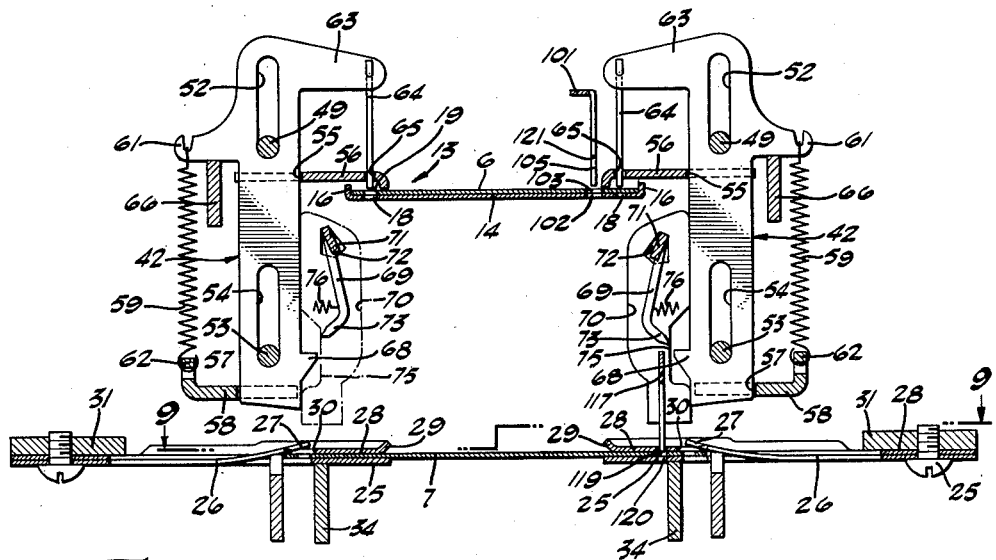

May 7, 1957
H. E. HOOE
2,791,275
DUPLICATING PUNCH
Filed Dec. 4, 1953
6 Sheets-Sheet 6
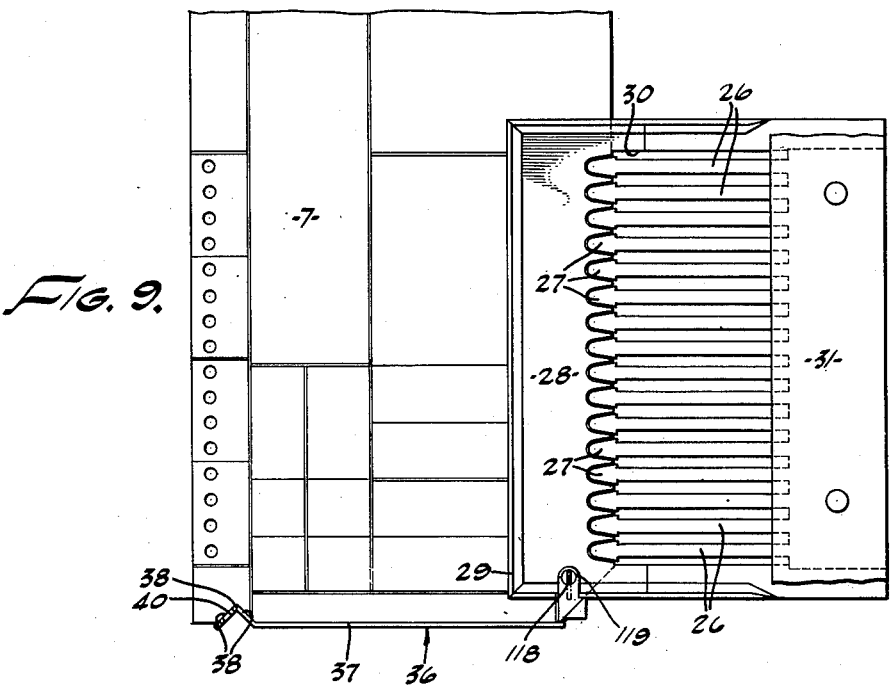
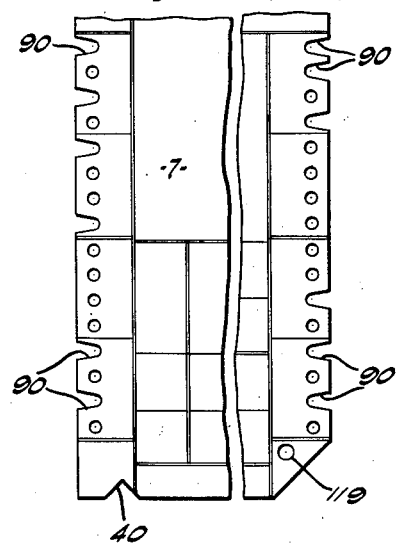
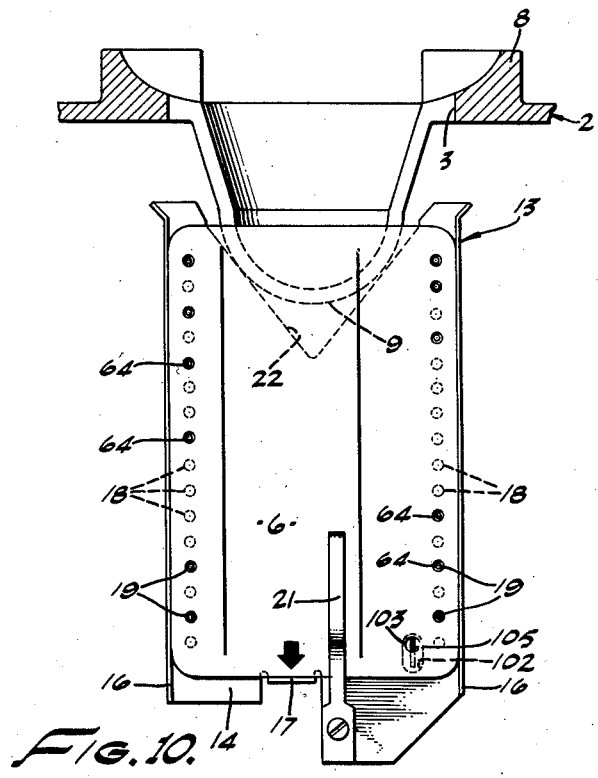
HUNTER E. HOOE
INVENTOR.
BY Meelin and Hanscom
ATTORNEYS.

United States Patent Office 2,791,275
Patented May 7, 1957

2,791,275

DUPLICATING PUNCH

Hunter E. Hooe, Athens, Ohio, assignor, by mesne assignments, to Royal McBee Corporation, a corporation of New York Application December 4, 1953, Serial No. 396,101

4 Claims. (Cl. 164—114)

This invention relates to code cutting machines, and particularly to a machine for code cutting record cards in an arrangement duplicating a coded master card.

It is among the objects of this invention to provide a machine for code marking record cards as, for example, sales slips, in duplication of the code marking of a coded master card as, for example, a credit card which has been code cut to identify a person to whom the card was issued and indicate data desired for purpose of classification and sorting.

Another object is to provide a machine for code marking cards, whereby the edges of record cards or slips may be accurately notched in exact conformity with the arrangement of code apertures punched in a master card for identifying the record slip with the master card.

Another object is to provide a code cutting machine for duplicating the coding of a master card upon a record slip, wherein the mechanism is locked against cutting operation if either the master card or the record card is out of registry with the other and the supports therefor.

A further object is to provide a machine of the character described wherein cutters for notching edge portions of a record card are activated by feeler means, sensitive to code apertures cut in a master card, so that only cutters corresponding to the coding of the master card are actuated at each operation of the machine.

Another object is to provide a code duplicating machine having a latch normally locking the mechanism against operation, and provided with control means, separately responsive to coding alignment of the master card and record card respectively, whereby disalignment of either card will prevent operation of the machine.

A still further object is to provide a machine of the character described embodying improved features of construction and arrangement, facilitating the assembly and operation of the machine, and providing "fool-proof" means for preventing incorrect coding of a record card.

The invention has other objects and features of advantage, some of which, with the foregoing, will be explained in the following description of that form of the invention illustrated in the drawings. It is to be understood that the invention is not limited to the embodiment shown in the drawings, as it may be embodied in other forms within the definition of the claims.

In the drawings:

Fig. 4 is a transverse vertical section taken upon the line 4—4 of Fig. 3, and illustrating in elevation the actuating and locking mechanisms.

Fig. 5 is a fragmental view showing parts of the mechanism, including the drive plate and the locking means therefor, at the end of the cutting movement.

Fig. 6 is a fragmental view similar to Fig. 5 illustrating the manner in which the drive plate is locked against operation by misalignment of a card.

Fig. 7 is a transverse sectional detail view illustrating the structure and relationship of the card supports and cutter actuating means in a starting position with the cards in registering relationship, the plane of the section being indicated by the line 7—7 of Fig. 3.

Fig. 8 is a view similar to Fig. 7, with the parts moved to the position occupied at the end of the cutting stroke.

Fig. 9 is a top plan view showing the structure and relationship of the record card support and cutting means and the aligning means for positioning the record card for the code cutting operation, the parts being viewed in the plane indicated by the line 9—9 of Fig. 7.

Fig. 10 is a transverse horizontal sectional view of the master card chute with a coded master card thereon, the plane of the section being indicated by the line 10—10 of Fig. 3.

Fig. 11 is a fragmental plan view of a portion of a record card having code notches cut in conformity with the coding of the master card shown in Fig. 10.

Fig. 12 is a fragmental sectional detail, taken upon the line 12—12 of Fig. 4.

Figure 1:
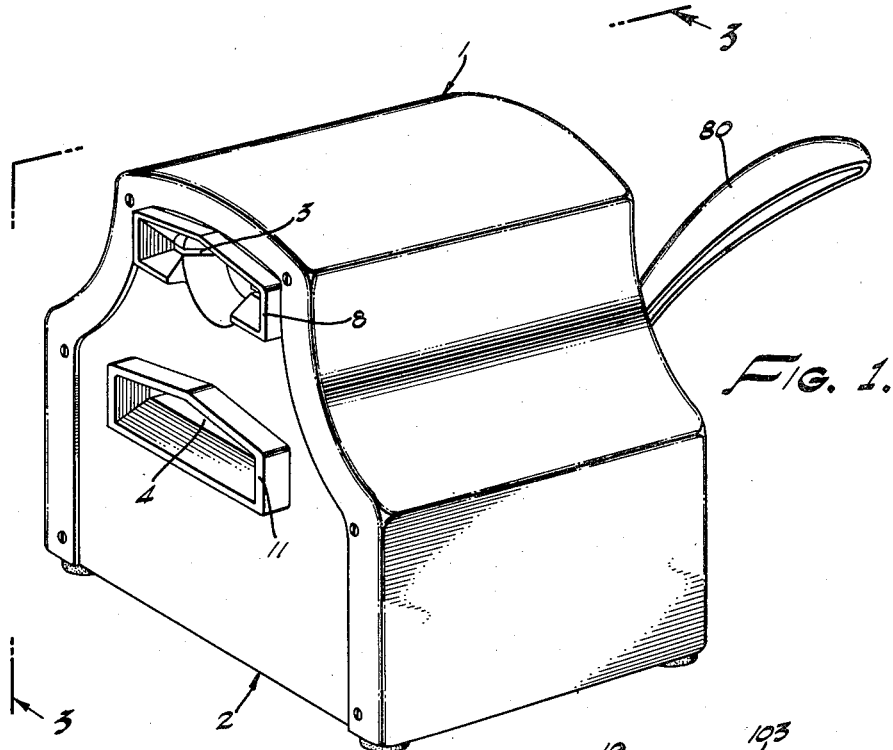
Fig. 1 is a perspective view of the code duplicating machine of the invention.
Figure 2:
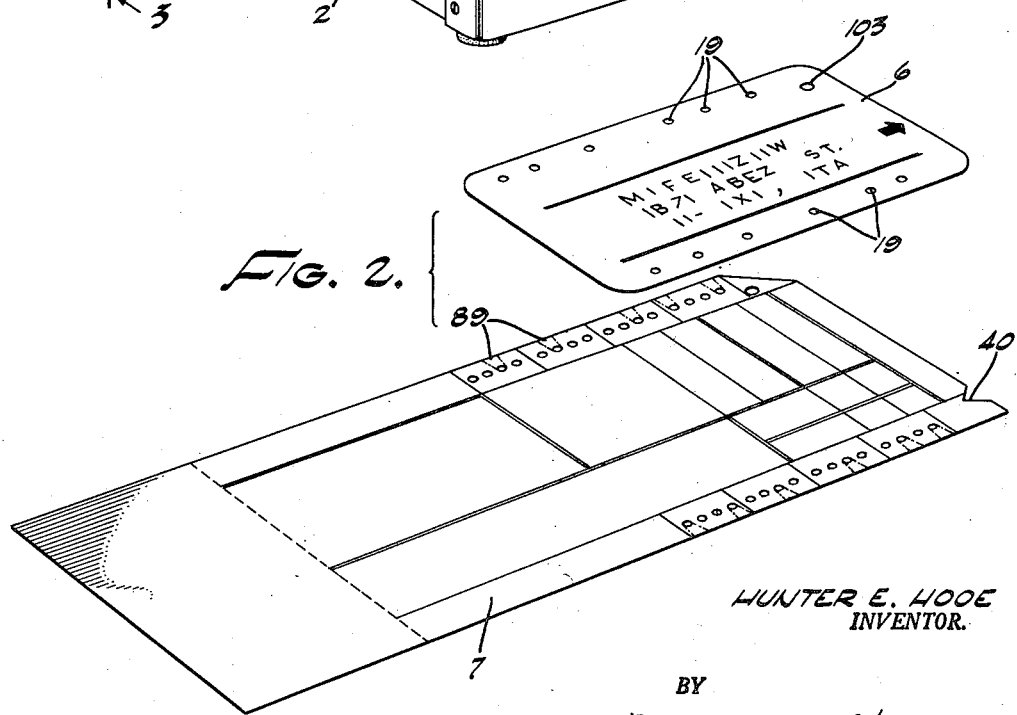
Fig. 2 is an exploded view illustrating the structure and relationship of the coded master card and uncoded record card in the positions occupied in the machine for the coding operation.

In terms of broad inclusion, the code cutting machine of the present invention comprises a housing provided with separate supports for a coded master card and an uncoded record card to be code cut in conformity with a master card placed on the master card support. Cutters are provided for notching edge portions of the record card at points corresponding to the arrangement of coding apertures formed in the master code card. The cutters are actuated by slides provided with feelers sensitive to the code apertures of the master card, the feelers being operable to normally support their cutter actuating slides in inoperative position, and to release to activated position only those slides which correspond to code apertures in the master card. The activated slides are moved to apply cutting pressure to the cutters by a hand lever and drive plate operatively associated with a movable carriage on which the cutter actuating slides are mounted. Separate card position detectors are provided for operation in association with the drive plate and a latch associated therewith to cause the drive plate to be locked against operation until both the coded master card and the record card to be coded are accurately aligned in registering relation to each other and to their supports. The mechanism is housed within a casing provided with ports through which the master card and record card may be readily inserted in aligned positions for duplicating the coding of the master card upon the record card.

In terms of greater detail, the machine of the present invention comprises a housing designated in general by the numeral 1. The front of the housing 1 is covered by a face plate 2 provided with card admitting slots 3 and 4 through which a coded master card 6 and an uncoded record card 7 may be inserted to coding positions in spaced registering alignment within the housing.

The slot 3 is bounded by an outwardly extending flange 8 having inclined inner surfaces converging toward the slot 3 for shielding the slot opening and for guiding a card 6 into the slot. The slot 3 opens through a cup-shaped guard 9, extending inwardly at about the center of the slot 3 to permit the card to be grasped between the thumb and fingers of an operator for positioning the card, and for removing it from its coding position inset within the housing 1. The slot 4 is similarly framed with an outwardly extending flange 11, also having inwardly converging inclined wall surfaces for guiding the record card 7 into the slot 4 between spaced inwardly extending guide flange portions 12. Preferably, the outer flanges 8 and 11, and the inwardly extending guard 9 and guide 12, are formed integrally with the face plate 2, as illustrated; but, of course, they may be formed separately for attachment to the face plate if desired.

A master card chute is mounted within the housing 1 in alignment with the slot 3 to receive a master card 6 introduced therethrough. The master card chute is designated in general by the numeral 13, and includes a card supporting plate 14 on which the card 6 is supported, when the card is inserted to its coding position. The plate 14 is provided with upwardly turned edge flanges 16 which form guides engaging the longitudinal edges of the card 6 to prevent any material lateral displacement of the card 6 within the chute. A lip 17 is upturned at the inner end of the plate 14 to limit inward movement of the card within the chute, and to provide a stop against which the card is moved and held in its coding position. The supporting plate 14 is provided with apertures 18 arranged in rows along the sides of the plate, said apertures being positioned in a manner such that they will register with code apertures 19 punched in the card 6. The apertures 19 are selectively positioned for identifying and classifying the card by the arrangement of coding apertures along the edges of the card 6. As many apertures 18 are provided along each edge of the supporting plate 14 as there are coding areas which may be apertured along the corresponding edge of the card, so that in whatever coding area of the card an aperture 19 may be placed, it will register with a corresponding aperture 18 of the supporting plate.

The chute 13 and the card 6 are correspondingly shaped so that the card will fit closely between the flanges of the supporting plate, with apertures 19 in the card aligned for registry with the corresponding apertures 18 of the support, as best illustrated in Fig. 10 of the drawings. A spring finger 21, secured to the supporting plate 14 at its inner end, serves to hold the card flat against the upper surface of the support plate 14. The outer end of the supporting plate 14 is notched, as at 22, to span the inwardly extending guard 9, and permit the coding edges to be firmly supported along the full length of the card and at the same time permit the outer end of the card to be grasped through the guard independently of the supporting plate.

A record card support is positioned in line with the slot 4 and the flanged guide portion 12 to receive and hold a record card 7 in coding position, in spaced registering alignment with the master card 6 and its supporting plate 14. The record card support comprises a pair of die plates 25 having resilient cutting fingers 26 struck from the body portion of the plates and normally offset to a position spaced above the plates to admit edge portions of a record card 7 therebetween. A finger 26 is provided to correspond to each coding aperture 18 of the plate 14. Each finger 26 is positioned directly under and in line with an aperture 18, and is provided with a pointed end 27 shaped to cut a V-shaped notch in the edge of the card 7 terminating in an aperture of the record card.

A stripper plate 28 is secured over each die plate 25. Each plate 28 has a body portion overlying the die plate and having a cut-out portion 30, registering with the fingers 26, through which the fingers are movable. The inner portion of the body of each plate 28 is offset from the plane of the plate and spaced from the companion die plate 25 sufficiently to admit an edge of a card 7 therebetween. An upturned flange 29 is formed along the ends and inner side edge of each plate 28, as a stiffener, and as a guide for directing the card under the stripper and between the fingers 26 and die plate 25. The stripper plate 28 is secured to the die plate 25 with which it is associated by screws or other suitable securing means, and the assembled plates form die units which may be mounted at opposite sides of the housing in spaced parallel relation to the master card and supporting plate 14.

The two die assemblies are mounted in spaced parallel relation by means of mounting bars 31 extending between a pair of spaced frame members 32 and 33 upon which the mechanism is assembed. Braces 34 are provided to support the inner ends of the die plate and stripper assemblies. An end plate 36 is mounted on the frame member 33 to span the space between the inner edges of the die assemblies. The plate 36 is provided with an abutment flange 37 limiting inward movement of the card 7. The flange 37 is provided with a flange extention 38 upon with is formed an aligning boss having inclined faces 39 converging to engage a V-shaped notch 40 formed upon the inner end of the card 7.

The abutment provided by the flange 37 is positioned to define the exact point to which the card 7 must be inserted to insure precise positioning of the card with respect to the die plates 25 and the master card support 14. The inclined faces 39 of the aligning boss 38, exert a wedge action which serves to shift the card transversely to exactly centered position with its edges accurately positioned between the cutting fingers 26 and the die plates 25 for code notching.

The cutting fingers 26 are arranged to be selectively pressed downwardly through the adjacent edge of the card and through the mating portion of the die plate, to shear V-shaped notches in the card edges. Cutting pressure is applied to the cutting fingers 26 by means of cutter actuating slides designated in general by the numeral 42, mounted in vertical alignment with the several cutting fingers 26. The cutter actuating slides are mounted upon and are actuated by a carriage designated in general by the numeral 43 mounted for vertically slidable movement relative to the frame members 32 and 33.

The carriage 43 comprises a pair of actuator plates 44 and 45 slidably mounted adjacent the outer sides of the frame members 33 and 32 respectively by means of bearing pins 46 extending through slots 47 formed in the plates 44 and 45, and secured to the frame members 32 and 33. The actuator plates 44 and 45 are also provided with slots 48 engaging guide shafts 49 secured to and extending between the upper portion of the frame members 32 and 33. The plates 44 and 45 are normally urged upwardly to the upward limit of their movement as defined by the engagement of the bearing pins 46 with the lower ends of the slots 47, and the guide shafts 49 within the slots 48. The center body portions of the plates 44 and 45 are cut away to provide openings 50 and 51 opposite the card supports.

The cutter actuating slides are slotted, as at 52, to slidably engage the guide shafts 49, so that the slides may be moved vertically with the carriage, or remain in elevated position while the carriage itself is moved downwardly. The cutter actuating slides 42 upon opposite sides of the carriage are also slidably engaged by guide rods 53 which extend through slots 54 in the slides. The rods 53 extend between the frame members 32 and 33 to which they are secured. The cutter actuating slides 42 are also slidably engaged within slots 55 formed in upper guide combs 56 mounted in overlying association with the master card supporting plate 14. The lower ends of the cutter actuating slides 42 are slidably engaged by slots 57 formed in a lower guide comb 58.

The upper and lower guide combs 56 and 58 are rigidly secured to the end frame members 32 and 33 with the slots 55 and 57 in vertical alignment. The slots 55 and 57 are spaced in conformity with the coding apertures 18 of the master card support and the cutting fingers 26 of the die assembly, an actuating slide 42 being provided for each cutter finger. Relatively light tension springs 59 are connected to hooks 61, which are formed on the actuating slides and extend laterally therefrom, and to a flange 62 carried by the lower guide comb 58. Each slide 42 is provided with an arm 63 projecting laterally to a position over the adjacent edge of the master card support plate 14. Feeler fingers 64 are mounted upon the arms 63 in a depending position aligned with apertures 65 in the upper comb 56 which in turn are aligned in registering relation with the apertures 18 in the card supporting plate 14. The upper ends of the fingers 64 engage apertures in the arms 63, positioned in vertical alignment with the apertures 18 and 65, and the feelers are movable axially through the aligned apertures 18 and 65.

The lower ends of the feeler fingers 64 are normally held in operative alignment with the apertures 18 by the apertures 65, with the extreme lower ends of the fingers positioned slightly above the level of a card 6 supported in code cutting position upon the supporting plate 14. The cutter actuating slides 42 are normally supported in their elevated positions, as indicated in Fig. 7 of the drawings, by actuator restorer bars 66 secured to the carriage plates 44 and 45, and extending through vertically disposed slots in the frame members 32 and 33. The springs 59 normally hold the hooks 61 in seated engagement against the upper edges of the bars 66, with the feeler fingers 64 raised above the level of a card 6 resting on the support plate 14.

Each cutter actuating slide 42 is provided with a power applying tooth 68 extending inwardly toward the center of the machine in substantially vertical alignment with the cutting ends of the cutting fingers 26. A punch bar 69 is pivotally mounted to extend between the carriage plates 44 and 45 adjacent the inner edges of each set of the actuating slides 42.

The punch bars 69 are pivotally supported by square shanks 71 having limited pivotal movement within openings 72 formed in the plates 44 and 45. The shanks 71 extend through cut out openings 70 in the center portions of the frame members 32 and 33, for engagement with the carriage plates 44 and 45. The punch bars are provided with tooth engaging flanges 73 angularly disposed along the lower edges of the body portions of the punch bars, and arranged to engage the tooth portions 68 for applying cutting pressure to the cutter actuating slides. Punch bar displacing cams 75 are formed on the frame members 32 and 33, along the sides of the openings 41, in alignment with the tooth portions 68 of the slides 42 when they are in their normal elevated positions. The cams are engaged by the punch bar flanges 73, when the carriage is in its raised position, and displace the punch bars pivotally out of engagement with the teeth 68. The cams 75 are shaped to permit the punch bars to swing to operative position so that the flange portions can engage the tooth portions of cutter actuating slides 42 activated as hereinafter more fully explained.

Normally, the carriage is raised to its normal starting position, with the cutter actuating slides 42 held in their uppermost positions, against the tension of the springs 59, as illustrated in Fig. 7 of the drawings. In that position, the punch bars 69 are displaced by the cams 75, to disengage all of the slide teeth 68, the teeth 68 being elevated into alignment with the cams 75 on opposing frame members 32 and 33. The punch bars are held in inwardly tilted positions against the tension of return springs 76 connected at opposite ends to the punch bars and to the frame members so as to urge the punch bars toward the adjacent slide members 42. In this elevated position, the feeling fingers 64 are suspended from the arms 63 with their lower ends positioned above the level of a master card supported on the plate 14, and are held in alignment with the code apertures 18 by the corresponding apertures 65 of the upper guide comb 56, as illustrated in Fig. 7 of the drawing.

Figure 3:
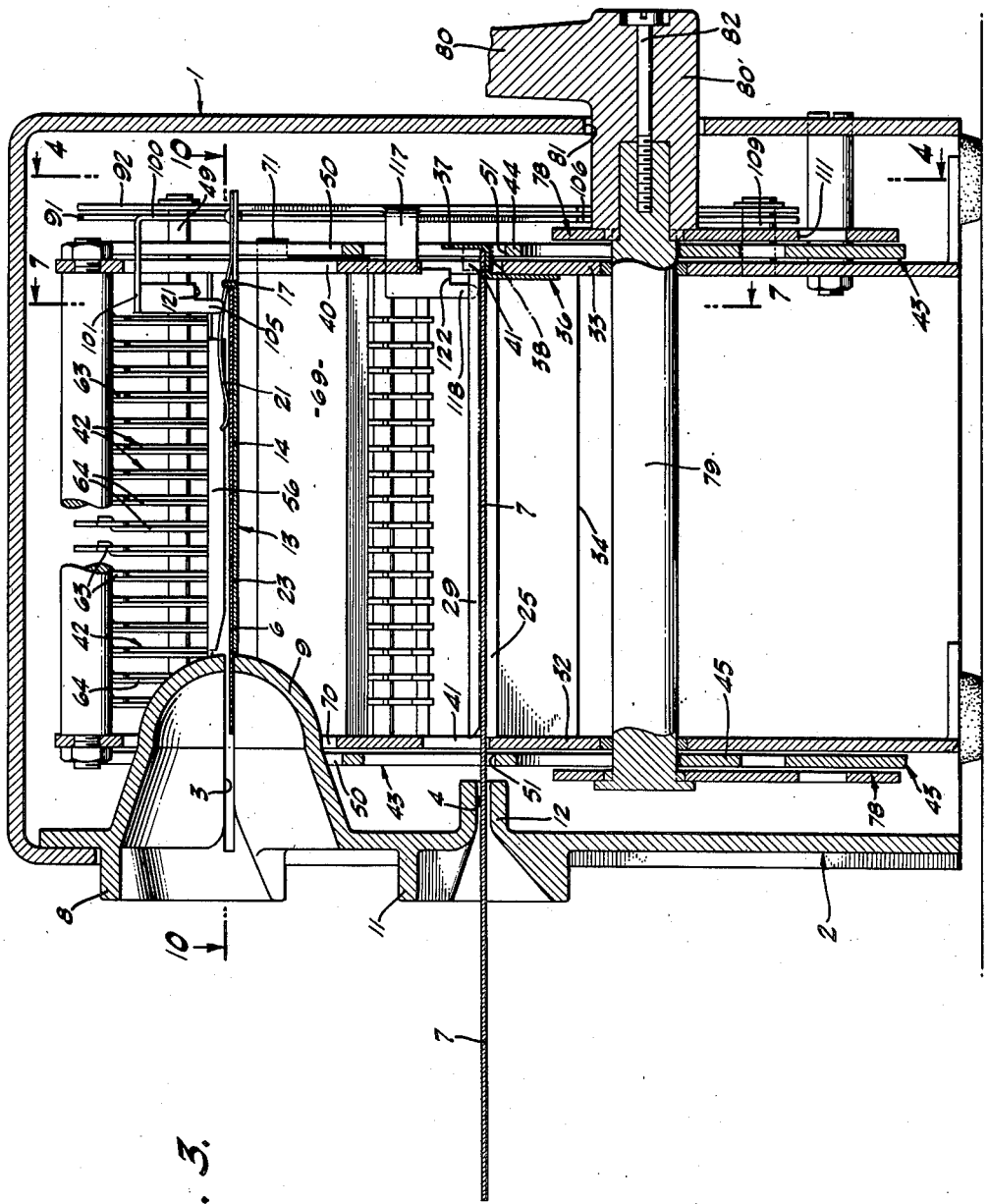
Fig. 3 is a vertical sectional view of the machine shown in Fig. 1, the plane of the section being indicated in general by the line 3—3 of Fig. 1.

The carriage 43 is moved up and down with respect to the frame members 32 and 33 by means of drive plates designated in general by the numeral 78. The drive plates are keyed or otherwise secured to a main drive shaft 79 journaled on the frame members 32 and 33. The drive plates 78 are positioned outwardly of the carriage plates 44 and 45, which in turn are positioned outwardly of the frame members 32 and 33. A hand lever 80 is provided with a hub 80' removably secured to the drive shaft. The hub 80' extends through an opening 81 in the housing 1, and is removably secured to the end of the drive shaft in any convenient manner, as by a machine screw 82 as best illustrated in Fig. 3 of the drawings. The drive plates 78 are provided with drive rolls 83 mounted on the plates, and extending inwardly therefrom into engagement with cam slots 84 formed in the carriage plates 44 and 45. The drive plates 78 are urged toward a normal starting position with the carriage 43 raised to its initial elevated position, by means of tension springs 86, aided by tension springs 85 secured to the drive plates 78 by anchor pins 87 riveted or otherwise secured to the drive plates. At the opposite ends, the springs 85 are secured to the upper guide shaft 49 or to other suitable fixed anchorage within the housing 1. The hand lever 80 is keyed to the drive shaft in a relationship such that, when the carriage 43 is raised to its normal starting position, the handle will incline upwardly at an angle of about 45 degrees as indicated in phantom lines in Fig. 4 drawings.

Downward pressure applied to the handle 80 causes the drive shaft 79, and the drive plates 78 keyed thereto, to be rotated in a counterclockwise direction as seen in Figs. 4, 5 and 6 of the drawings. Such movement of the drive plate 78 causes the drive rolls 83 to move the carriage 43 bodily downwardly within the housing 1. Downward movement of the carriage lowers the bars 66 on which the hooks 61 seat, so that the slides 42 are subjected to the downward pull of the springs 59.

Assuming that a coded master card 6 has been placed in coding position upon a master card supporting plate 14, the feeler fingers 64 will be moved downwardly to engage the card. In areas where there are no coding apertures 19 in the master card, the feeler fingers will seat against unapertured areas of the card, and will hold the slides 42 in elevated position against the downward pull of the springs 59. At points where coding apertures 19 have been formed in the master card, the feeler fingers may pass through such apertures, and through the corresponding apertures 18 in the supporting plate immediately thereunder.

As a feeler finger passes downwardly through a card aperture 19 and the registering aperture 18 in the underlined supporting plate, the slide 42 associated therewith is pulled downwardly by its spring 59 to an activated position in which the tooth 68 is positioned below the cams 75 for engagement by the punch bar flange 73 as it swings under the lower ends of the cams. Only those feeler fingers 64 which correspond with code apertures 19 in the master code card can pass through the card, and hence only the slides to which those feeler fingers are attached, are released from their normal operating position to an activated punch actuating position.

As the punch bars 69 are moved downwardly with the carriage, the ends of the flanges 73 swing into engagement with the teeth 68 of the slides which have been released to activated position. Further downward movement of the carriage, under pressure applied through the hand lever 80, forces the actuating slides against the cutter fingers 26, which are thereby forced through the edge of the record card 7 to shear out a fragment 89 from the edge portion of the card, to form a V-shaped notch 90 in the edge of the card at a position corresponding exactly to the position of the code aperture 19 to which the cutter corresponds.

This action is illustrated in Fig. 8 of the drawings wherein the feeler pin 64 carried by the slide 42 shown at the right hand side of the figure, seats against an unapertured area of the master card 6, and holds the slide in its elevated position against the downward pull of the spring 59 as illustrated. The feeler finger 64 carried by the slide 42 at the left hand side of Fig. 8 of the drawings, has encountered a coding aperture 19, and a corresponding aperture in the supporting plate, so that the finger may pass downwardly through the support. This permits the slide to be moved downwardly to its activated position, whereby its tooth 68 is engaged by the punch bar 71 and forced downwardly against the underlying cutting finger 26, as illustrated. After the cutting stroke is completed, the hand lever is raised to its starting position, thereby causing the drive plates and the activated cutter actuating slides to be returned to their starting position.

While the machine of the present invention is useful for duplicating the code markings of a master card onto a second card wherever such duplication of code may be desirable, the device is particularly useful for duplicating the code marking of a credit card (the master card) upon a sales slip (the record card) for identifying the sales slip with the credit card for entering a charge, or for other purposes. Obviously, it is essential that the code duplicated must be produced in exactly corresponding positions so as to avoid any possible inaccuracy. Exact duplication, of course, depends upon exact registration of the master card and record card with respect to their supports and to each other, and inaccuracy in the relative positioning of the cards would cause an incorrect coding which in turn would result in a charge to a party other than the one properly to be charged.

To avoid such inaccuracy, and to preclude the possibility of a record card being coded to incorrectly identify and charge the purchase, the present machine is provided with card positioning means separately associated both with the master card and the record card, so that if either of the cards is misaligned or positioned out of register, the mechanism will be locked against operation. To that end, there has been provided in the present mechanism a master card position detector 91 and a record card position detector 92 independently operable so that, if either card is carelessly placed in the machine in a non-registering position, the operation of the machine will be prevented until the correct positioning of the cards has been accomplished. Both detectors operate in connection with a latch 93, pivoted upon the frame member 32, and normally held in a position to be engaged by a shoulder 96 upon the adjacent drive plate 78. The latch 93 is pivoted upon a fixed pin 94 and is normally urged toward an unlocking position by a spring 95 secured at one end to detent pin 97 on the latch, and at the other end to fixed anchor pin 98 secured to the frame member 32.

The master card detector 91 comprises an elongated body having a slot 99 in its upper end slidably engaging one of the guide shafts 49 on which the carriage 43 is movable. A laterally extending arm 100 projects transversely from the detector body 91 toward the center of the machine. An extension 101 projects forwardly through the upper open area 50 of the plate 44 and the opening 70 in the frame member 33 to a position over the master card supporting plate 14. A finger 105, projecting downwardly from the extension 101, is positioned in exact vertical alignment with a positioning hole 102 formed in the supporting plate 14.

A positioning aperture 103 is provided in the master card 6 to register with the hole 102 when the card is in its exact code duplicating position in registry with the card supporting plate 14. The finger 105 is sufficiently rigid to shift the master card and correct a slight inaccuracy in its initial positioning if the holes 102 and 103 overlap sufficiently to admit the finger. However, if the card is not fully advanced in the master card chute, so that the finger 105 cannot enter the positioning aperture 103, the finger 105 will be held in elevated position against the tension of a spring 104 normally urging the detector downwardly from the elevated position illustrated in Figs. 3, 4, and 6 of the drawings.

The lower end of the detector 91 is bifurcated to provide a guide arm 106 and a latch control arm 107. The guide arm 106 is provided with a slot 110 slidably engaging a guide pin 109 secured to the frame 33 and projecting outwardly through a slot 111 in the drive plate 78 and through a slot 108 formed in the member 92. The slots 99 and 110 of the detector 91 engage the guide pin 109 and guide shaft 49 respectively, and permit vertical movement of the detector with the carriage 45, or independently thereof, while holding the detector against any pivotal or transverse movement. The latch control arm 107 is positioned to engage the detent pin 97, and to control its movements between its locking and unlocking positions. The edge of the latch control arm 107, which engages the detent pin 97 provides a stop which limits outward movement of the detent pin 97 under the tension of the spring 95, and normally holds the latch 93 in a position in the path of movement of the shoulder 96 of the drive plate 78.

A recess 112 is formed in the detent engaging edge of the latch control arm 107 to permit outward movement of the detent pin 97 sufficiently to move the latch shoulder 96 out of the path of the drive plate as shown in Fig. 5 of the drawings. The recess 112 is defined by inclined cam faces 113 which control the movement of the detent pin as the detector 91 is lowered from the normal starting position illustrated in Fig. 4 of the drawings. The detector 91 is normally held in an elevated starting position, against the tension of its spring 104, by the actuator restorer bar 66 which engages the underside of the lateral extension 114 to which the spring 104 is attached.

The record card detector is substantially the same as the master card detector 91, except that it is provided with a laterally extending arm 116 positioned slightly above the level of the record card support, and is provided with an extension 117 and finger 118 corresponding to the extension 101 and finger 105 of the master card detector, for similarly engaging registering apertures 119 and 120 in the record and in the record support, to detect misalignment of the record card with the notch cutting assembly on which it is supported for the code cutting operation.

Normally, both detectors 91 and 92 are raised by the actuator restorer bar to an elevated position wherein the detent engaging face of the latch control arm 107 of each detector is operative to hold the latch 93 in a locking position, as indicated in Fig. 4 of the drawings. As the drive plate 78 is turned to force the carriage downwardly along its cutting stroke, the bar 66 permits downward movement of the detectors 91 and 92 under the influence of the springs 104 associated therewith respectively. If both the master card 6 and record card 7 are in proper code duplicating position, the position detecting fingers 105 and 118 will move downwardly respectively through the registering apertures 102 and 103 in the master card and the master card support, and apertures 119 and 120 in the record card and record card support. This downward movement of the detector will cause the recesses 112 of the control arms 107 to be lowered to positions opposite the detent pin 97 and thereby permit the latch 93 to be swung outwardly out of the path of the actuating plate, as shown in Fig. 5 of the drawings.

If either card is not in accurate registry with its supporting plate, the detector finger 105 or 118 associated therewith will be held up, and downward movement of the detector 91 or 92 will be prevented, and the unlatching movement of the latch 93 will be prevented. As a result, movement of the drive plates 78 will be blocked by engagement of the shoulder 96 with the latch before the carriage reaches a position such as to permit the punch bar 69 to engage and actuate the cutter actuating slides which are activated by engagement of the feeler fingers 64 with code openings in the master card as above explained. In this way, operation of the cutting mechanism is blocked unless and until the master card and record card are both accurately positioned for the code duplicating operation.

The detectors 91 and 92 are also arranged to prevent operation of the cutting mechanism if the operator fails to insert either card onto its support. This is accomplished by providing shoulders 121 and 122 at the upper ends of the fingers 105 and 118 respectively where said fingers are attached to the extensions 101 and 117. The shoulders 121 and 122 are shaped to seat against the edge portions of the cards 6 and 7 bounding the apertures 103 and 119, and thereby limit downward movement of the detectors to a point where the recesses 112 will receive the latch pin 97 in latch releasing position. However, if no card 6 or 7 is placed in the machine, or if either is not advanced sufficiently to cover the openings 103 or 120 in its support, the detector will continue to move downwardly and cause its recess 112 to pass beyond the pin 97. In that case, the portion of the control arm above its recess 112 will serve to hold the latch in its locking position. This prevents an operator from thoughtlessly cutting a record card without introducing the required credit card into the machine, in which case code notches would be cut in all coding areas and the record card would be useless. Similarly, omission of the record card, with consequent failure to code and record a charge, would be prevented.

While the code duplicating machine of the present invention is susceptible to use in many connections where it is desired to duplicate the code markings of a master card upon another card to be identified with the master card for purpose of future classification and recording, the device as herein described is particularly useful for duplicating the code identification of a credit card upon a sales slip. In this connection, the person holding the credit card, and to whom the purchase is to be charged, may be positively identified for purpose of bookkeeping and billing without the delays, errors, and misunderstandings incident to the manual writing of names, addresses, account numbers, and similar data incident to credit transactions. For example, persons holding credit cards with a distributor of gasoline, oil, and automobile accessories, may make purchases at frequent intervals at various stations operated by the company. The records of such purchases must be segregated and charged through a central organization, and these operations involve a substantial outlay of time, labor and material. Error or insufficiency of identification of each purchase with the credit account to which it is to be charged may result in substantial loss to the dealer.

For such service, the device of this invention contemplates a credit card having code apertures 19 punched at selected points for specifically identifying the credit card holder. As illustrated, areas are provided for placing code apertures in a selected arrangement in any of sixteen coding areas along each longitudinal side of the master card as herein referred to. The number of coding areas, of course, may be increased if desired, and the different arrangements of coding apertures for identifying individual accounts may be increased practically without limit. The records of the issuing company will of course identify the name, address, and other data relating to the credit card holder.

When a purchase is made, the credit card is inserted onto the master card support 14 of the code duplicating machine. At the same time, a sales slip bearing such data as may be required to show the goods purchased, is inserted on the record card support of the machine. The record card is provided with rows of apertures corresponding to the coding areas of the credit cards, so as to provide an aperture which will register with the coding apertures of the credit card regardless of how the credit card apertures may be arranged. When the two cards are properly positioned on their respective supports, the hand lever 80 is depressed, and the drive plate 78 is moved to force the carriage 43 downwardly and thereby move the activated cutter slides 42 to press the corresponding cutting fingers through the record card, and form notches in the edges thereof extending to the apertures which correspond to the code apertures of the master card. Since inaccurate alignment of either card would result in an incorrect coding of the record card, the position detectors 91 and 92 are arranged to permit operation only when both cards are present and correctly positioned, and to prevent operation of the cutters when either of the cards is absent or out of registry. At each operation, only those cutter slides are effective for cutting notches in the edges of the record card, which are activated and lowered to operative positions by movement of the feeler fingers 64 through the registering apertures of the master card and its support. As a consequence, each record card is notched in exact conformity with the code apertures of the master card. The notches permit the record cards to be quickly and accurately sorted in accordance with the code notching. Cards code marked at various stations are collected at a central office, and then may readily be segregated and identified with the credit card to which they have been coded. In this way, the time, effort and possibility of error, incident to manual sorting and classification, will be greatly lessened.

Having thus described my invention, what I claim and desire to secure by Letters Patent is as follows:

1. A code duplicating machine for coding record cards comprising a master card support, a record card support, a plurality of punches adapted to punch code a record card supported on said record card support, a plurality of punch actuators associated one with each of said punches and adapted to engage said punches, a plurality of sensing pins connected one to each of said punch actuators and adapted to project through coded apertures in a master card supported on said master card support, individual spring means for urging each of said punch actuators in a direction to insert said sensing pins through said coded apertures in said master card whereby the punch actuators having sensing pins aligned with apertures will be moved to an activated position and those having sensing pins not aligned with coded apertures will be stopped by said master card, a lateral abutment on each of said punch actuators, a drive member adapted to contact said lateral abutments to drive said punch actuators, and cam means for preventing said drive member from contacting said lateral abutments until said drive member has passed the abutments on the non-activated punch actuators.

2. A code duplicating machine for coding record cards comprising a master card support, a record card support, a plurality of punches adapted to punch code a record card supported on said record card support, a plurality of punch actuators associated one with each of said punches and adapted to engage said punches, a plurality of sensing pins connected one to each of said punch actuators and adapted to project through coded apertures in a master card supported on said master card support, individual spring means for urging each of said punch actuators in a direction to insert said sensing pins through said coded apertures in said master card whereby the punch actuators having sensing pins aligned with apertures will be moved to an activated position and those having sensing pins not aligned with coded apertures will be stopped by said master card, a lateral abutment on each of said punch actuators, a drive member adapted to contact said lateral abutments to drive said punch actuators, cam means for preventing said drive member from contacting said lateral abutments until said drive member has passed the abutments on the non-activated punch actuators, and spring means for urging said drive member into the plane of said lateral abutments.

3. A code duplicating machine for coding record cards comprising a master card support, a record card support, a plurality of punches adapted to punch code a record card supported on said record card support, a plurality of punch actuators associated one with each of said punches and adapted to engage said punches, means for retaining said punch actuators in their retracted positions, a plurality of sensing pins connected one to each of said punch actuators and adapted to project through coded apertures in a master card supported on said master card support, individual spring means for urging each of said punch actuators in a direction to insert said sensing pins through said coded apertures in said master card whereby the punch actuators having sensing pins aligned with coded apertures will be moved to an activated position and those having sensing pins not aligned with coded apertures will be stopped by said master card, a lateral abutment on each of said punch actuators, a drive member adapted to contact said lateral abutments to drive said punch actuators, cam means for preventing said drive member from contacting said lateral abutments until said drive member has passed the abutments on the non-activated punch actuators, and drive means for first releasing said punch actuator retaining means and subsequently moving said drive member into engagement with said lateral abutments to actuate said activated punch actuators.

4. A code duplicating machine for coding record cards comprising a master card support, a record card support, a plurality of punches adapted to punch code a record card supported on said record card support, a plurality of punch actuators associated one with each of said punches and adapted to engage said punches, means for retaining said punch actuators in their retracted positions, a plurality of sensing pins connected one to each of said punch actuators and adapted to project through coded apertures in a master card supported on said master card support, individual spring means for urging each of said punch actuators in a direction to insert said sensing pins through said coded apertures in said master card whereby the punch actuators having sensing pins aligned with coded apertures will be moved to an activated position and those having sensing pins not aligned with coded apertures will be stopped by said master card, a lateral abutment on each of said punch actuators, a drive member adapted to contact said lateral abutments to drive said punch actuators, cam means for preventing said drive member from contacting said lateral abutments until said drive member has passed the abutments on the non-activated punch actuators, spring means for urging said drive member into the plane of said lateral abutments, and drive means for first releasing said punch actuator retaining means and subsequently moving said drive member into contact with said lateral abutments to actuate said activated punch actuators.

References Cited in the file of this patent

UNITED STATES PATENTS

| | | |
|---|---|---|
| 983,254 | Swing | Jan. 31, 1911 |
| 985,258 | Grimsdale | Feb. 28, 1911 |
| 1,239,861 | Arcus | Sept. 11, 1917 |
| 1,788,694 | Thomas | Jan. 13, 1931 |
| 1,934,934 | Lorant | Nov. 14, 1933 |
| 2,004,208 | Lasker | June 11, 1934 |